(12) United States Patent
Liu

(10) Patent No.: US 12,507,145 B2
(45) Date of Patent: Dec. 23, 2025

(54) MULTICAST SERVICE TRANSMISSION METHOD AND APPARATUS, AND COMMUNICATIONS DEVICE

(71) Applicant: VIVO MOBILE COMMUNICATION CO., LTD., Dongguan (CN)

(72) Inventor: Jiamin Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 370 days.

(21) Appl. No.: 18/134,565

(22) Filed: Apr. 13, 2023

(65) Prior Publication Data

US 2023/0254749 A1    Aug. 10, 2023

Related U.S. Application Data

(63) Continuation of application No. PCT/CN2021/123545, filed on Oct. 13, 2021.

(30) Foreign Application Priority Data

Oct. 16, 2020  (CN) .......................... 202011111861.9

(51) Int. Cl.
*H04W 40/02*  (2009.01)
*H04L 1/1812*  (2023.01)

(52) U.S. Cl.
CPC ........... *H04W 40/02* (2013.01); *H04L 1/1812* (2013.01)

(58) Field of Classification Search
CPC ....... H04W 40/02; H04W 76/40; H04W 4/06; H04W 36/0007; H04W 40/36; H04L 1/1812; H04L 1/1822; H04L 2001/0093; H04L 1/189; H04L 5/0055; H04L 45/16
See application file for complete search history.

(56) References Cited

U.S. PATENT DOCUMENTS

| 2023/0040690 A1* | 2/2023 | Chen ...................... H04W 72/30 |
| 2023/0110505 A1* | 4/2023 | Wang ........................ H04L 1/08 370/331 |
| 2023/0171566 A1* | 6/2023 | Wang ...................... H04W 4/06 370/312 |

FOREIGN PATENT DOCUMENTS

| CN | 101296412 A | 10/2008 |
| CN | 103546302 A | 1/2014 |
| CN | 109429186 A | 3/2019 |
| CN | 111771422 A | 10/2020 |
| WO | 2018001897 A1 | 1/2018 |

OTHER PUBLICATIONS

Lenovo et al. "Protocols and Dynamic Switching for 5G MBS PTP and PTM", 3GPP TSG-RAN WG2 Meeting #111, R2-2007466. (Year: 2020).*

(Continued)

*Primary Examiner* — Huy D Vu
*Assistant Examiner* — Robert Ma
(74) *Attorney, Agent, or Firm* — IPX PLLC

(57) ABSTRACT

A multicast service transmission method and apparatus, and a communications device, are provided. The method includes obtaining data of a target multicast service on a first transmission path, where the first transmission path includes at least one of a Point-To-Point (PTP) transmission path and a Point-To-Multipoint (PTM) transmission path.

20 Claims, 6 Drawing Sheets

(56) References Cited

OTHER PUBLICATIONS

Ericsson "Mechanism to improve reliability for RRC_Connected UEs receiving PTM transmission".3GPP TSG-RAN WG1 Meeting #102-e, R1-2006919, Aug. 17, 2020, (Year: 2020).*
MediaTek Inc "UE Reception Model of MBS Radio Bearer and its Dynamic PTM/PTP switch", 3GPP TSG-RAN WG2 Meeting #111 electronic, R2-2006575, Aug. 28, 2020 (Year: 2020).*
Oppo "Dynamic PTM and PTP switching with service continuity", 3GPP TSG-RAN EG2 Meeting #111, R2-2006803, Aug. 28, 2020. (Year: 2020).*
International Search Report issued in corresponding International Application No. PCT/CN2021/123545, mailed Jan. 5, 2022, 4 pages.
First Office Action issued in related Chinese Application No. 202011111861.9, mailed Aug. 15, 2022, 14 pages.
Lenovo et al. "Protocols and Dynamic Switching for 5G MBS PTP and PTM", 3GPP TSG-RAN WG2 Meeting #111, R2-2007466, Aug. 2020, 3 pages.
MediaTek Inc et al. "UE Reception Model of MBS Radio Bearer and its Dynamic PTM/PTP switch", 3GPP TSG-RAN WG2 Meeting #111, R2-2006575, Aug. 2020, 15 pages.
Second Office Action issued in related Chinese Application No. 202011111861.9, mailed Jan. 11, 2023, 11 pages.
Extended European Search Report issued in related European Application No. 21879437.8, mailed Jun. 5, 2024, 23 pages.
CATT: "Discussion on basic functions for broadcast/multicast for RRC—IDLE/RRC—INACTIVE UEs", 3GPP Draft; R1-2005695, Aug. 2020; 4 pages.
Lenovo et al: "Mode Decision and Dynamic Switching between PTM and PTP", 3GPP Draft; R3-204921, Aug. 2020, 3 pages.
OPPO: "Dynamic PTM and PTP switching with service continuity" , 3GPP Draft; R2-2006803, Aug. 2020; 5 pages.
Ericsson: "Mechanisms to improve reliability for RRC—Connected UEs receiving PTM", 3GPP Draft; R1-2006919, 5 pages.
Mediatek Inc: "Ue Reception Model of MBS Radio Bearer and its Dynamic PTM/PTP switch", 3GPP Draft; R2-2006575, 15 pages.

* cited by examiner

MULTICAST SERVICE TRANSMISSION METHOD AND APPARATUS, AND COMMUNICATIONS DEVICE

CROSS-REFERENCE TO RELATED APPLICATIONS

This application is a continuation of International Application No. PCT/CN2021/123545, filed on Oct. 13, 2021, which claims priority to Chinese Patent Application No. 202011111861.9, filed on Oct. 16, 2020. The entire contents of each of the above-identified applications are expressly incorporated herein by reference.

TECHNICAL FIELD

The present disclosure relates to the field of communications technologies, and in particular, to a multicast service transmission method and apparatus, and a communications device.

BACKGROUND

In the related art, in a Multimedia Broadcast multicast service Single Frequency Network (MBSFN) manner and a Single Cell Point To Multipoint (SC-PTM) manner, a Point To Multipoint (PTM) transmission path is used for transmission of a Multicast Broadcast Service (MBS). In a New Radio (NR) system, a higher requirement is put forward for Quality of Service (QoS) of a multicast service, and an existing transmission manner of the multicast service cannot meet the relatively high QoS requirement.

SUMMARY

Embodiments of this application provide a multicast service transmission method and apparatus, and a communications device.

According to a first aspect, a multicast service transmission method is provided, applied to a terminal and including:
obtaining data of a target multicast service on a first transmission path, where
the first transmission path includes at least one of a point-to-point PTP transmission path and a PTM transmission path.

According to a second aspect, a multicast service transmission method is provided, applied to a network side device and including:
transmitting data of a target multicast service on a first transmission path, where
the first transmission path includes at least one of a point-to-point PTP transmission path and a point-to-multipoint PTM transmission path.

According to a third aspect, a multicast service transmission apparatus is provided, applied to a terminal and including:
a first obtaining module, configured to obtain data of a target multicast service on a first transmission path, where
the first transmission path includes at least one of a point-to-point PTP transmission path and a PTM transmission path.

According to a fourth aspect, a multicast service transmission apparatus is provided, applied to a network side device and including:
a first transmission module, configured to transmit data of a target multicast service on a first transmission path, where
the first transmission path includes at least one of a point-to-point PTP transmission path and a point-to-multipoint PTM transmission path.

According to a fifth aspect, a terminal is provided. The terminal includes a processor, a memory, and a program or an instruction that is stored in the memory and that can be run on the processor, where the program or the instruction is executed by the processor to implement the steps of the method in the first aspect.

According to a sixth aspect, a network side device is provided. The network side device includes a processor, a memory, and a program or an instruction that is stored in the memory and that can be run on the processor, where the program or the instruction is executed by the processor to implement the steps of the method in the second aspect.

According to a seventh aspect, a readable storage medium is provided. The readable storage medium stores a program or an instruction, and the program or the instruction is executed by a processor to implement the steps of the method in the first aspect or the steps of the method in the second aspect.

According to an eighth aspect, a chip is provided. The chip includes a processor and a communications interface, the communications interface is coupled to the processor, and the processor is configured to run a program or an instruction to implement the steps of the method in the first aspect or the steps of the method in the second aspect.

According to a ninth aspect, a computer program product is provided. The computer program product is stored in a non-volatile storage medium, and the computer program product is executed by at least one processor to implement the steps of the method in the first aspect or the steps of the method in the second aspect.

DETAILED DESCRIPTION

The following describes the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

In the specification and claims of this application, the terms "first," "second," and the like are intended to distinguish between similar objects but do not describe a specific order or sequence. It should be understood that, data termed in such a way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the specification and the claims, "and/or" represents at least one of connected objects, and a character "I" generally represents an "or" relationship between associated objects.

It should be noted that, the technologies described in the embodiments of this application are not limited to a Long Term Evolution (LTE)/LTE-Advanced (LTE-A) system, and can also be used in other wireless communications systems such as Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA), and another system. The terms "system" and "network" in the embodiments of this application may be used interchangeably. The technologies described can be applied to both the systems and the radio technologies mentioned above as well as to other systems and radio technologies. However, the following descriptions describe a New Radio (NR) system for example purposes, and NR terms are used in most of the following descriptions, although these technologies can also be applied to an application other than an NR system application, for example, a $6^{th}$ Generation (6G) communications system.

Figure 1:
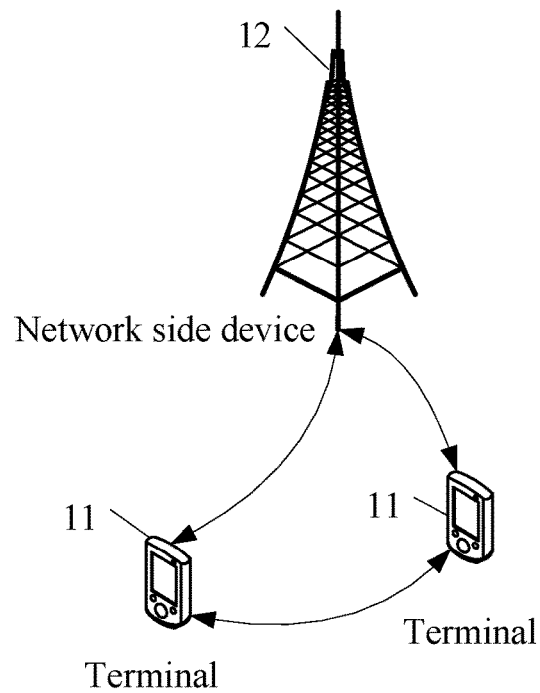
FIG. 1 is a structural diagram of a network system to which the embodiments of this application can be applied.

FIG. 1 is a block diagram of a wireless communications system to which embodiments of this application can be applied. The wireless communications system includes a terminal 11 and a network side device 12. The terminal 11 may also be referred to as a terminal device or User Equipment (UE). The terminal 11 may be a terminal side device such as a mobile phone, a tablet personal computer, a laptop computer or a notebook computer, a Personal Digital Assistant (PDA), a palmtop computer, a netbook, an Ultra-Mobile Personal Computer (UMPC), a Mobile Internet Device (MID), a wearable device, Vehicle User Equipment (VUE), or Pedestrian User Equipment (PUE). The wearable device includes a bracelet, a headset, glasses, and the like. It should be noted that a specific type of the terminal 11 is not limited in the embodiments of this application. The network side device 12 may be a base station or a core network. The base station may be referred to as a NodeB, an evolved NodeB, an access point, a Base Transceiver Station (BTS), a radio base station, a radio transceiver, a Basic Service Set (BSS), an Extended Service Set (ESS), a NodeB, an evolved NodeB (eNB), a home NodeB, a home evolved NodeB, a WLAN access point, a Wi-Fi node, a Transmission and Reception Point (TRP), or another appropriate term in the art. As long as a same technical effect is achieved, the base station is not limited to a specified technical term. It should be noted that, in the embodiments of this application, only a base station in an NR system is used as an example, but a specific type of the base station is not limited.

With reference to the accompanying drawings, a multicast service transmission method provided in the embodiments of this application is described in detail by using specific embodiments and application scenarios.

Figure 2:
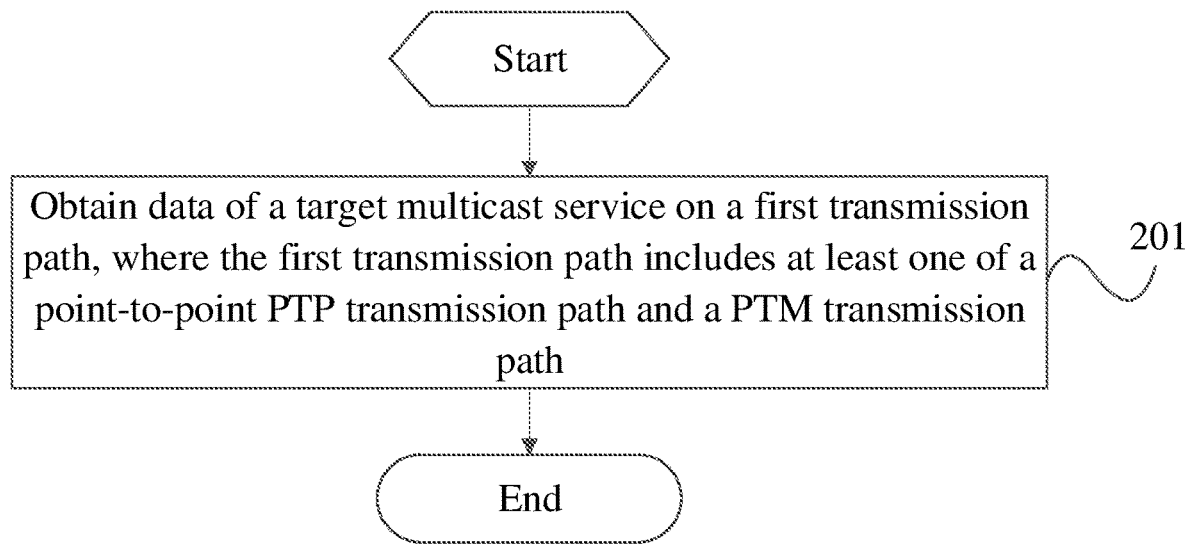
FIG. 2 is a first schematic flowchart of a multicast service transmission method according to an embodiment of this application.

As shown in FIG. 2, an embodiment of this application provides a multicast service transmission method, applied to a terminal and including:

Step 201: Obtain data of a target multicast service on a first transmission path.

The first transmission path includes at least one of a Point-To-Point (PTP) transmission path and a Point-To-Multipoint (PTM) transmission path.

In this embodiment of this application, a base station configures the PTP transmission path and the PTM transmission path for the terminal, so that the terminal can obtain the data of the target multicast service on at least one of the PTM transmission path and the PTP transmission path.

According to the multicast service transmission method in this embodiment of this application, at least one transmission path can be selected from a PTP transmission path and a PTM transmission path to obtain data of a target multicast service, that is, multicast service transmission can be flexibly performed by using the PTP transmission path and the PTM transmission path, thereby providing better Quality of Service (QoS) guarantee for services with relatively high service lossless and continuous requirements. Therefore, network resource efficiency is ensured, and a Multicast Broadcast Service (MBS) service reception effect of a terminal is greatly improved on the basis of determining system efficiency.

In some implementations, the multicast service transmission method in this embodiment of this application further includes:

obtaining transmission path configuration information, where the transmission path configuration information is used to indicate configuration information of the PTM transmission path and the PTP transmission path.

In some implementations, the transmission path configuration information includes first configuration information and second configuration information;

the first configuration information is used to indicate configuration information of the PTM transmission path and configuration information of a Multicast Radio Bearer (MRB); and the second configuration information is used to indicate configuration information and association information that are of the PTP transmission path, and the association information is used to indicate an MRB associated with the PTP transmission path, or is used to indicate a service identifier associated with the PTP transmission path.

In some implementations, the first configuration information is carried by using a System Information Block (SIB) or broadcast signaling, and the second configuration information is carried by using Radio Resource Control (RRC) signaling; or both the first configuration information and the second configuration information are carried by using RRC signaling.

In this embodiment of this application, when an MBS service is transmitted in a same cell, a network may consider one or a combination of the following factors to configure two transmission paths for UE: a PTM transmission path and a PTP transmission path:

the MBS service has relatively high block error rate and service continuity requirements;

a location of the terminal, for example, if the terminal is at a location at which PTM coverage is poor, another PTP may be configured for supplement;

the terminal has a relatively high service requirement, for example, subscribing to a high-definition user, where a tariff and a package are different from those of a common user;

the terminal UE has a low power saving requirement, for example, a user is currently in a period of sufficient power, and because when configuring the PTP transmission path, the terminal needs to enter a connected state to monitor scheduling and perform measurement, power consumption is relatively high; and a user tendency, for example, the user may report a tendency of the user, for example, expect to have better QoS guarantee and establish the associated PTP transmission path.

In addition, in this embodiment of this application, for a service whose block error rate and service continuity requirements are not high, only the PTP transmission path may be configured.

Figure 3:
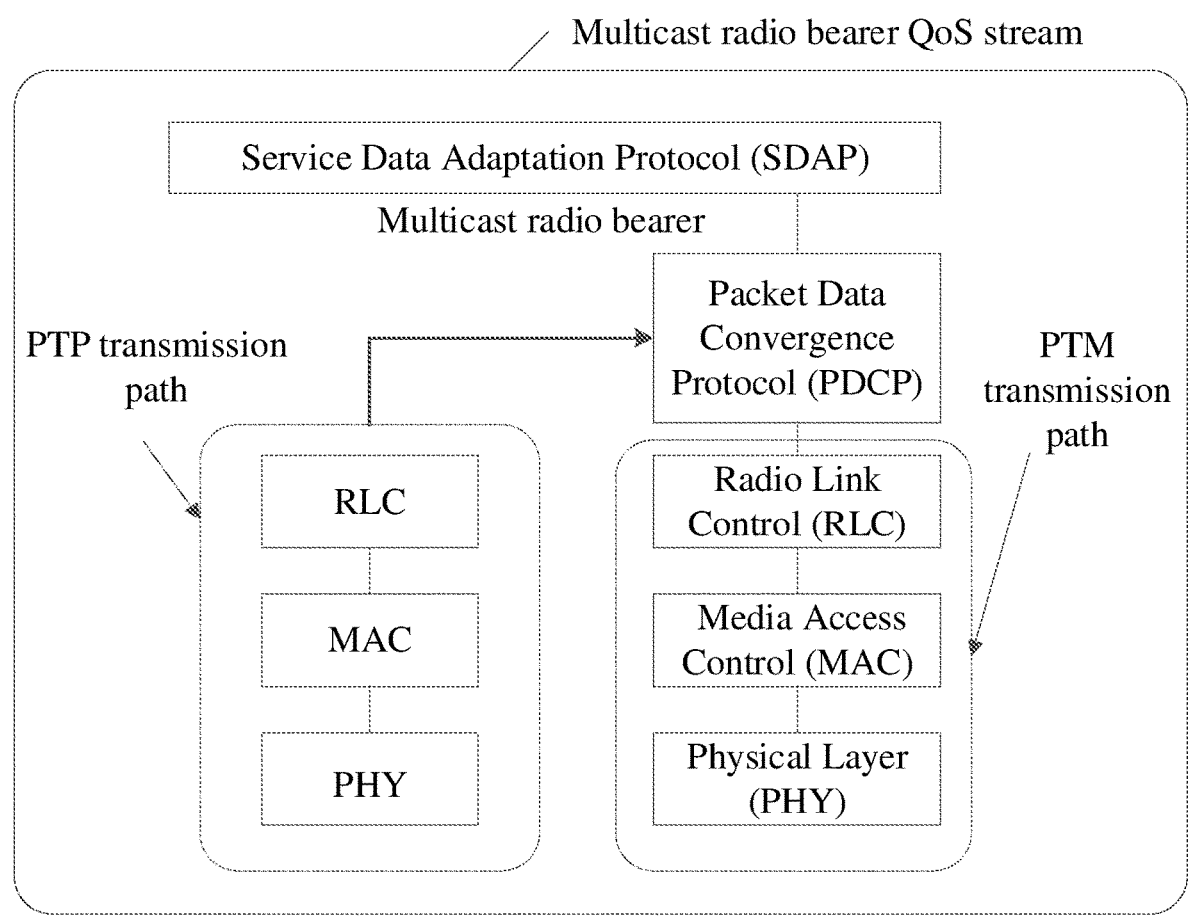
FIG. 3 is a schematic diagram of a PTM transmission path and a PTP transmission path according to an embodiment of this application.

The terminal may obtain configuration of the PTM transmission path from a SIB, broadcast signaling, or dedicated signaling. For an MBS, there may be one or more MRBs. Each MRB bearer corresponds to one PTM transmission path. According to different protocol stack architectures, the PTM transmission path may include Radio Link Control (RLC), Medium Access Control (MAC), and PHYsical layer (PHY), or may include only MAC and PHY. The PTP transmission path needs to be configured by using RRC dedicated signaling. Like PTM, PTP is also divided in a different manner according to a protocol stack, and may include RLC, MAC, and PHY, or may include only MAC and PHY. Once a protocol stack manner is selected, the same protocol stack is used for PTP and PTM. As shown in FIG. 3, FIG. 3 is a schematic diagram of a protocol stack received by a terminal. One MRB has a common Packet Data Convergence Protocol (PDCP) layer. A layer below the PDCP layer may be split into two transmission paths: a PTP transmission path and a PTM transmission path, and data is received from different paths and aggregated to the common PDCP layer.

In some implementations, a manner in which the network configures the two transmission paths for the terminal may be as follows:

Manner 1: Configuration manner in which broadcast signaling and dedicated signaling are combined:

A SIB or broadcast signaling is used to configure information about an MRB level for the UE, for example, service cycle information, scheduling information, a PDCP layer parameter, and information about configuring the PTM transmission path for the terminal, for example, an RLC layer parameter, a MAC layer parameter, a PHY layer parameter, and an information group group Radio Network Temporary Identifier (g-RNTI) used for group scheduling.

Dedicated signaling is used to configure information about a PTP transmission path for the UE. An MRB or a service identifier associated with the PTP transmission path needs to be specified, for example, a multicast service identifier (Temporary Mobile Group Identity (TMGI)), and an RLC layer parameter, a MAC layer parameter, and a PHY layer parameter may be further included. In some implementations, a Cell Radio Network Temporary Identifier (C-RNTI) used for unicast scheduling is further included. If there is another unicast service before the UE, the C-RNTI is previously obtained and is directly used.

Manner 2: Dedicated signaling configuration manner. In this manner, all configuration information is provided by using dedicated signaling together. There are two configuration manners:

(1) PTM and PTP are respectively configured. This manner is similar to the foregoing manner 1. RRC dedicated signaling is used to give MRB and PTM configurations, and then RRC dedicated signaling is used to give a PTP configuration, where identifier information that can associate the PTP configuration with a MRB may be carried.

(2) PTM and PTP are configured together. In this manner, all information is sent together. RRC dedicated signaling is used to give MRB and PTM configurations, and a PTP configuration. Because the information is sent together, there may be a natural binding relationship in a signaling format, and information associated with PTP and MRB may be given or omitted.

In some implementations, according to the method in this embodiment of this application, the transmitting data of a target multicast service on a first transmission path includes:

receiving first multicast service data on the PTM transmission path;

sending first information, where the first information is used to indicate a result of receiving the first multicast service data; and obtaining second multicast service data on at least one of the PTP transmission path and the PTM transmission path, where the first multicast service data and the second multicast service data are data of the target multicast service.

In some implementations, the first multicast service data is initially transmitted data of the target multicast service, and the second multicast service data is retransmitted data of the first multicast service data.

Herein, a network device may retransmit an unsuccessfully received data packet on at least one of the PTP transmission path and the PTM transmission path according to a feedback of the terminal on initially transmitted data on the PTM transmission path.

In some implementations, the sending first information includes:

sending the first information at a target feedback location, where the first information includes a Hybrid Automatic Repeat reQuest (HARQ) feedback, and the target feedback location includes a dedicated feedback location for each terminal, or the target feedback location is a common feedback location.

In some implementations, the first information includes at least one of a Packet Data Convergence Protocol (PDCP) feedback and a Radio Link Control protocol (RLC) feedback.

In an embodiment of this application, when the UE obtains configurations of two transmission paths for one MRB, a reception manner shown in FIG. 3 is established. Therefore, the network side may use PTP as a supplement to PTM, thereby further improving QoS. The method is as follows:

Basic MBS service data is sent on a corresponding MRB, a PDCP Protocol Data Unit (PDU) is initially transmitted on a PTM transmission path. For transmission on the PTM transmission path, receiving UE in a connected state or all UEs configured with a PTP transmission path are configured for dedicated a HARQ feedback.

Because receiving UE in a connected state or all UEs configured with a PTP transmission path are UEs in an RRC connection to the network side, the network may allocate independent feedback locations to the UEs by using dedicated signaling, for example, UE 1 performs feedback at a feedback location 1, UE 2 performs feedback at a feedback location 2, and so on.

Herein, all UEs in a connected state have respective feedback locations, so that the network side determines whether to perform retransmission by knowing whether reception of each UE is correct or not. For example, for 100 UEs, if two UEs feed back a Negative ACKnowledgement (NACK), the network may not perform retransmission. If ten UEs feed back a NACK, the network side needs to perform PTM retransmission, to ensure that more UEs can perform successful reception.

In addition, when the UE configured with the PTP transmission path obtains a dedicated feedback location of the UE, the network may know reception of which UE or UEs is incorrect, to determine whether to perform retransmission on the PTM transmission path or perform retransmission on the PTP transmission path.

For UE other than the foregoing two types (receiving UEs in a connected state and all UEs configured with a PTP transmission path), because there is no RRC connection to the network side, the UE cannot obtain a dedicated feedback location of the UE, and therefore cannot perform feedback or perform feedback at a common location. The common feedback location may be obtained by using a SIB or broadcast signaling.

The network side may determine, according to a dedicated feedback and/or a common feedback, to adopt which retransmission manner: PTM retransmission or PTP retransmission.

Generally, when a quantity of users that fail to receive data in a current transmission is relatively large, the PTM retransmission manner is preferred. Because retransmission is still PTM transmission, retransmission may be performed on all UEs at one time. UE that successfully receives data is directly considered as duplicate reception, and may perform discarding. UE that feeds back a NACK may perform combined reception.

When a quantity of users that fail to receive data in a current transmission is relatively small, a PTP leg retransmission manner is preferred, and more targeted scheduling and transmission may be performed for a small quantity of users.

In some implementations, two retransmission manners may be used. PTM retransmission is for most users, and PTP may still strengthen an effect on a key user.

Because PTM retransmission may be HARQ retransmission, HARQ combination may not only performed on data transmitted before and after, but also a segment reassembly operation may be performed at an RLC layer. Therefore, transmission efficiency is high.

For PTP retransmission, because data needs to be delivered again from the PDCP layer to another PTP transmission path, it is actually new transmission for the RLC layer and the MAC layer. In addition, a required transmission granularity is a complete PDCP PDU, and a PDCP PDU segment cannot be transmitted, because the segment is performed at the RLC layer. For example, if a last segment of a data packet of a PDCP sequence number 101 is previously transmitted on the PTM transmission path, a Serving Data Unit offset (SDU offset)=500 bytes and a length of the segment is 200 bytes, that is, the last 200 bytes of a complete data packet whose size is 700 bytes are transmitted. During retransmission, all 700 bytes of the data packet of the PDCP Sequence Number (SN) 101 need to be transmitted on the PTP transmission path. In this way, RLC side of PTP can reassemble complete data of the PDCP SN 101 and deliver the data to the PDCP for sorting processing.

In some implementations, the PDCP layer may process a PDCP PDU segment, and RLC report segment information and a segmented PDU part to the PDCP, and PDCP performs reassembly processing. In this way, only the PDCP PDU segment is retransmitted on the PTP transmission path. Therefore, transmission efficiency is higher, but function division of an existing protocol stack is modified and enhanced.

In some implementations, if the PTP transmission path and the PTM transmission path have a common RLC layer, path switching at the PDCP PDU segment level may be performed for retransmission, and reassembly is performed by the common RLC layer.

In this embodiment of this application, if PTM retransmission is performed, HARQ retransmission is performed. Similar to the existing retransmission manner, one retransmission is scheduled by using a g-RNTI corresponding to the service, and a HARQ process ID is the same as that during initial transmission, and then retransmission is identified. In this way, after reception, the UE may perform combination and duplication detection processing on previous transmission according to the HARQ process ID.

If PTP retransmission is performed, cross-layer interaction needs to be introduced. The MAC or RLC layer notifies the PDCP of an RLC PDU situation and a segmentation situation included in the MAC PDU, and then the PDCP reorganizes retransmission of a corresponding data packet or data packet segment.

In particular, the PTP transmission path and the PTM transmission path may use a same RLC layer. In this way, during PTP retransmission, retransmission is performed on a MAC PDU, or HARQ combination may be performed. PTM is scheduled by using a g-RNTI and PTP is scheduled by using a C-RNTI. However, HARQ process IDs thereof are the same, and a retransmission flag is used for retransmission. In this way, HARQ combination and duplication detection processing can also be performed.

In this embodiment of this application, retransmission and continuous transmission may be performed on another transmission path according to a transmission feedback on one transmission path (the PTP transmission path or the PTM transmission path), thereby ensuring QoS of receiving an MBS service by the terminal, and further improving system efficiency.

In some implementations, the data of the target multicast service includes third multicast service data and fourth multicast service data; and the obtaining data of a target multicast service on a first transmission path includes:

obtaining the third multicast service data on the PTM transmission path, and obtaining the fourth multicast service data on the PTP transmission path, where the third multicast service data and the fourth multicast service data are multicast service data obtained by replicating the same data in the target multicast service.

In some implementations, the target data includes a PDCP PDU or a MAC PDU.

In some implementations, the method in this embodiment of this application further includes:

performing first processing on the third multicast service data and the fourth multicast service data at a PDCP layer, a media access control MAC layer, or an RLC layer, where the first processing includes at least one of duplication detection, reordering, and HARQ combination.

In an embodiment of this application, the terminal establishes two transmission paths: the PTP transmission path and the PTM transmission path. The network device may enable a duplication transmission function for the terminal according to at least one of the following conditions:

an MBS service has very high block error rate and latency requirements, for example, a block error rate of $10^{\wedge}(-8)$, and a transmission latency of 5 ms, where for such a service, to ensure that the UE can correctly perform reception with an extremely high probability in a short time, resource efficiency can be sacrificed to obtain extremely high QoS guarantee;

a location of the UE, for example, the UE is at a place at which PTM coverage is poor, and PTP may be considered for simultaneous transmission, to improve a rate of correct reception;

the terminal has a relatively high service requirement, for example, subscribing to a high-definition user, where a tariff and a package are different from those of a common user; and a user tendency, for example, the user may report a tendency of the user, for example, expect to have excellent QoS guarantee and perform duplication transmission on the PTP transmission path in a case that resources are allowed.

When the network device determines to enable a duplication transmission function for the terminal to transmit the MBS service, the following two manners may be used:

Manner 1: PDCP Layer Duplication

In this manner, the PDCP layer corresponding to the MRB on the network side performs a duplication action, that is, the PDCP layer replicates each PDCP PDU to form two identical data packets, and respectively sends the data packets to the PTM transmission path and the PTP transmission path for transmission.

For the UE, data is received on each of the two transmission paths, and the data is sent to a common PDCP layer. The PDCP layer performs sorting and duplication detection according to a PDCP SN, to ensure delivery in order.

In this manner, each transmission path includes RLC, MAC, and PHY protocol layers.

Manner 2: MAC Layer Duplication

In this manner, a duplication sending mechanism is performed by a MAC layer on the network side. That is, when a MAC PDU needs to be sent, a multicast resource and a unicast resource are respectively scheduled by using a g-RNTI and a c-RNTI simultaneously or are not simultaneously for transmission. Except a different scheduling manner, MAC PDU content transmitted in the two transmission manners is the same, and combination and HARQ process ID duplication detection may be performed on the MAC. One MAC SDU is sent to an upper layer only once.

In this manner, each transmission path includes MAC and PHY protocol layers.

In some implementations, the method in this embodiment of this application further includes:

obtaining second information, where the second information includes at least one of the following:

configuration information of duplication transmission; and activation information of duplication transmission, where the duplication transmission is transmitting the same multicast service data on the PTM transmission path and the PTP transmission path.

Herein, the network side may explicitly notify the UE of PTP and the PTM duplication transmission. For example, when RRC dedicated signaling is configured, a duplication field is set, where true or presence indicates that the network side performs duplication sending. Therefore, the UE needs to perform not only g-RNTI multicast reception, but also C-RNTI unicast reception. In addition, duplication may be configured but not activated to perform duplication dynamic activation or deactivation in a manner of sending a MAC CE on the PTP transmission path.

If duplication is not configured or activated, the UE may independently perform unicast reception and multicast reception. For example, unicast is controlled by a unicast Discontinuous Reception (DRX) parameter, and multicast is controlled by a multicast DRX parameter. After duplication is configured or activated, unicast reception of the UE needs to consider reception of multicast data, that is, PDCCH monitoring of a C-RNTI needs to consider not only possible scheduling of existing unicast, but also scheduling of the PTP transmission path of the MBS service of multicast DRX.

In some implementations, the network side may not notify duplication configuration or activation information. Because the two transmission paths are configured on the UE side, monitoring needs to be performed on the two transmission paths according to respective scheduling, and duplication detection is performed on received duplication data at the MAC or PDCP layer. However, in this manner, a unicast DRX configuration and a multicast DRX configuration need to be considered jointly. An active time of unicast DRX needs to include a moment at which multicast may be scheduled, to ensure that the UE can receive data of two legs simultaneously. This coordinated configuration is implemented by the network.

In addition to the duplication manner, when the UE is configured with the two transmission paths, the network side may further perform dynamic routing selection, that is, the network side may determine, based on at least one of a data type of each data packet, a quantity of terminals that receive the target multicast service, resource load, and the first information, a path through which transmission is to be performed.

Generally, when UE in an idle state or an inactive state receives an MBS service in a cell, the network needs to ensure that multicast data is always sent on PTM always. The UE cannot establish the PTP transmission path, and therefore the UE does not support dynamic path switching. In this case, if a user has two transmission paths, data is always transmitted on a PTM transmission path of the user. Therefore, the PTP transmission path can only be used for retransmission or duplication transmission.

In another case, one MRB includes two types of data: basic data and enhanced data. For example, standard-definition video stream data is basic data, which may be sent on the PTM transmission path, and high-definition or even ultra-high-definition video stream data is enhanced data, which may be sent on the PTP transmission path. In this way, the UE in an idle state may receive only basic data, and enjoy standard-definition video experience, and the UE on the PTP transmission path may receive complete data and enjoy high-definition or even ultra-high-definition video experience. Because data on PTM is only a part of data of an MRB, PDCP SNs may be not consecutive, SN=1, 5, 8 . . . , and enhanced data is missing in the middle. However, for idle UE, a reordering timer is not started, and data may be delivered to an upper layer in an order of 1, 5, 8 . . . to decode a standard-definition video.

If only UE in a connected state receives an MBS service in a cell, or UE in an inactive state may also schedule the PTP transmission path by using a C-RNTI in this cell, all receiving UEs have dual transmission path configurations, and the network side may dynamically determine path selection. For example, when a PDCP layer determines to send a PDCP PDU to PTP or PTM, or determines to send to each MAC PDU to PTP or PTM.

For example, when a quantity of users receiving services is small, the PTP path is used for sending. In a case that individual scheduling efficiency is high, and a quantity of users receiving services is large, the PTM path is used for sending. One transmission is directed to a plurality of users, and resource efficiency is high.

In some implementations, some relatively important data packets are sent on the PTP path, and other common packets are sent on the PTM path. For example, a basic frame or an important frame in a video compression stream is sent on the PTP transmission path, and other frames are sent on the PTM transmission path.

According to resource load, in a case that resource load is high, the PTM transmission path is used for sending, thereby reducing resource consumption; in a case that resource load is low, the PTP transmission path is used for sending, and a reception effect is better.

In a case that a PTM transmission effect is not good, sending is performed in a PTP manner, and switching to PTP is performed for all users, or sending is performed in a PTP manner for only some users.

Herein, data packets received on different paths may be reordered the PDCP layer.

In some implementations, the method in this embodiment of this application further includes:

obtaining reconfiguration information, where the reconfiguration information is used to instruct the terminal to switch a transmission path of the multicast service data.

In some implementations, in a case that the reconfiguration information is used to instruct the terminal to switch the transmission path of the multicast service data from the PTM transmission path to the PTP transmission path, after the obtaining reconfiguration information, the method further includes at least one of the following:

if the terminal is in an idle state or an inactive state, entering, by the terminal, a connected state, requesting to configure the PTP transmission path, and maintaining a Sequence Number (SN) status of a PDCP layer corresponding to the PTM transmission path after obtaining configuration information of the PTP transmission path and establishing the PTP transmission path;

reporting a data reception status on the PTM transmission path; and performing data reception on the PTP transmission path, transmitting received data to the PDCP layer, and performing SN ordering on the transmitted data and original received data, and delivering the sorted data to an upper layer in order.

In this embodiment of this application, if the terminal is in a connected state, the terminal reports, in real time, an MBS service information list of interest to the terminal, so that the network side learns whether the terminal is interested in the MBS service.

When at least one of the following conditions is met in a cell, a sending manner of the MBS service is switched from PTM to PTP:

a quantity of terminals that are interested in an MBS service or are performing reception in the cell is less than a specified threshold; and resource load of the cell is less than a specified threshold.

In a specific embodiment of this application, if the network side determines to switch the transmission path of the MBS service from the PTM transmission path to the PTP transmission path, the network device sends the configuration information of the PTP transmission path to the terminal, for example, by using RRC dedicated signaling. After receiving the configuration information, the terminal performs corresponding configuration according to a parameter of the network side.

In some implementations, because switching to the PTP transmission path is performed, for the PDCP layer, a security protection function and a header compression function are both enabled. The network side may also indicate whether the functions need to be enabled, and the terminal performs a corresponding operation according to an instruction of the network side.

In an embodiment of this application, when the terminal in an idle state or an inactive state receives a notification that a sending manner of the MBS service is to be switched to PTP, the UE needs to enter a connected state and request a configuration of the PTP transmission path. A specific request manner is as follows:

Manner 1: An RRC connection establishment request or completion message carries a special indication, indicating that the terminal does not enter a connected state for ordinary unicast, but excepts to receive the MB S service sent in a PTP manner or to obtain configuration information of the MBS service.

Manner 2: Dedicated UL RRC signaling is used to report information about an MBS service of interest to the network, to request a related configuration of the network.

Manner 3: Both manner 1 and manner 2 are used.

After the UE obtains the configuration information of the PTP transmission path and establishes the PTP transmission path, all SN statuses of the PDCP layer of original PTM transmission need to be maintained, and a security protection or header compression function is enabled according to the configuration. According to a configuration requirement of the network side, if the UE needs to report an original reception status of PTM by using a PDCP control (status) PDU, organizes a reception status PDU, and sends the status to the network side. The UE performs normal data reception on the PTP transmission path, sends the data to the PDCP layer for SN sorting with the original received data, and delivers the sorted data to an upper layer in order.

In some implementations, in a case that the reconfiguration information is used to instruct the terminal to switch the transmission path of the multicast service data from the PTP transmission path to the PTM transmission path, after the obtaining reconfiguration information, the method further includes at least one of the following:

if the terminal is in an idle state or an inactive state, obtaining configuration information of the PTM transmission path, and maintaining an SN status of a PDCP layer corresponding to the PTP transmission path after obtaining the configuration information of the PTM transmission path and establishing the PTM transmission path;

reserving the PTP transmission path and reporting a data reception status on the reserved PTP transmission path; and performing data reception on the PTM transmission path, transmitting received data to the PDCP layer, and performing SN ordering on the transmitted data and original received data, and delivering the sorted data to an upper layer in order.

In this embodiment of this application, if the terminal is in a connected state, the terminal reports, in real time, an MBS service information list of interest to the terminal, so that the network side learns whether the terminal is interested in the MBS service.

When at least one of the following conditions is met in a cell, a sending manner of the MBS service is switched from PTP to PTM:

a quantity of terminals that are interested in an MBS service or are performing reception in the cell is greater than a specified threshold; and resource load of the cell is greater than a specified threshold.

In an embodiment of this application, if the network side determines to switch the transmission path of the MBS service from PTP to PTM, and the network does not send configuration information of the PTM transmission path, the configuration information of the PTM transmission path is sent to the UE, for example, is sent by using RRC dedicated signaling or broadcast signaling. After receiving the configuration information, the UE directly performs configuration according to a configuration parameter of the network side.

In some implementations, before the PTP transmission path is used before switching, both PDCP security protection and header compression functions are enabled. However, the PDCP security protection and header compression functions generally cannot be performed on the PTM transmission path. Therefore, if the PDCP layer security protection and header compression functions are previously enabled, these functions need to be disabled.

In an embodiment of this application, when the terminal in an idle state or an inactive state receives a notification that a sending manner of the MBS service is to be switched to PTM, the UE needs to obtain the configuration information of the PTP transmission path. A specific manner is as follows:

Manner 1: If the configuration information of the PTM transmission path is sent by using broadcast signaling, the terminal directly reads the information, and does not need to perform state switching.

Manner 2: If the network side indicates that the terminal needs to enter a connected state, the terminal enters a connected state through state switching to obtain the configuration information of the PTP transmission path and then releases the connection.

After the terminal obtains the configuration information of the PTP transmission path and establishes the PTM transmission path, all original SN statuses of the PDCP layer corresponding to the PTP transmission path need to be maintained. If a security protection or header compression function is enabled according to the original status, the security protection or header compression function is disabled. According to a network side configuration requirement, if the UE still reserves PTP after the PTM transmission path is established, and configures reporting of status information, the UE reports an original reception status of PTP by using a PDCP status PDU, organizes a reception status PDU, and sends the status to the network side by using a reserved PTP leg. The UE performs normal data reception in a PTM leg, sends the data to the PDCP layer for SN sorting with the original received data, and delivers the sorted data to an upper layer in order.

In some implementations, the method in this embodiment of this application further includes:

in a case that a transmission path on a target cell after a handover is the PTP transmission path, after the terminal accesses the target cell, performing a PDCP control PDU report of the target multicast service according to a handover command; or in a case that a transmission path on a target cell after a handover is the PTM transmission path, after the terminal accesses the target cell, obtain configuration information of the PTP transmission path by using a handover command, establish the PTP transmission path according to the configuration information of the PTP transmission path, and perform a PDCP control PDU report and obtain target data according to the established PTP transmission path, where the target data includes first data corresponding to a sequence number gap and data after the first data.

For example, if data received by the terminal includes data whose SNs are 1, 2, and 5, the first data corresponding to the sequence number gap is data whose SNs are 3 and 4.

After receiving the target data, the terminal may perform duplication detection and reordering at the PDCP layer to achieve lossless reception.

In an embodiment of this application, in different cells, L2 SNs of data packets of an MBS service may be synchronized between base stations or in a same base station, that is, for a same service data packet with same content, L2 SNs are equal, and the L2 SN may be a PDCP SN and/or an RLC SN. In the case of L2 SN synchronization, that is, reordering and duplication detection may be performed on received data of a PTP/PTM leg of the source cell and received data of a PTP/PTM leg of the target cell according to L2 SNs thereof to achieve continuity and lossless reception.

A signaling interaction process in a cell handover process is as follows:

A source cell sends a handover request to a target cell, where the handover request message carries information about MBS service;

the target cell sends a response message of the handover request to the source cell, where the response message includes a handover command instructing the source cell to send handover signaling to the terminal, and the response message carries at least one of configuration information, fourth information, and fifth information of the target multicast service, where the fourth information is used to indicate whether a reception status of the target multicast service needs to be fed back; and the fifth information is used to indicate whether to configure the PTP transmission path;

the terminal configures the corresponding MBS service according to the handover command, accesses the target cell, and initiates a PDCP status report according to the fourth information; and the target cell receives the PDCP status report and retransmits sequence number gap data on the PTP transmission path.

According to the multicast service transmission method in this embodiment of this application, at least one transmission path can be selected from a PTP transmission path and a PTM transmission path to obtain data of a target multicast service, that is, multicast service transmission can be flexibly performed by using the PTP transmission path and the PTM transmission path, thereby providing better QoS guarantee for services with relatively high service lossless and continuous requirements. Therefore, network resource efficiency is ensured, and an MB S service reception effect of a terminal is greatly improved on the basis of determining system efficiency.

Figure 4:
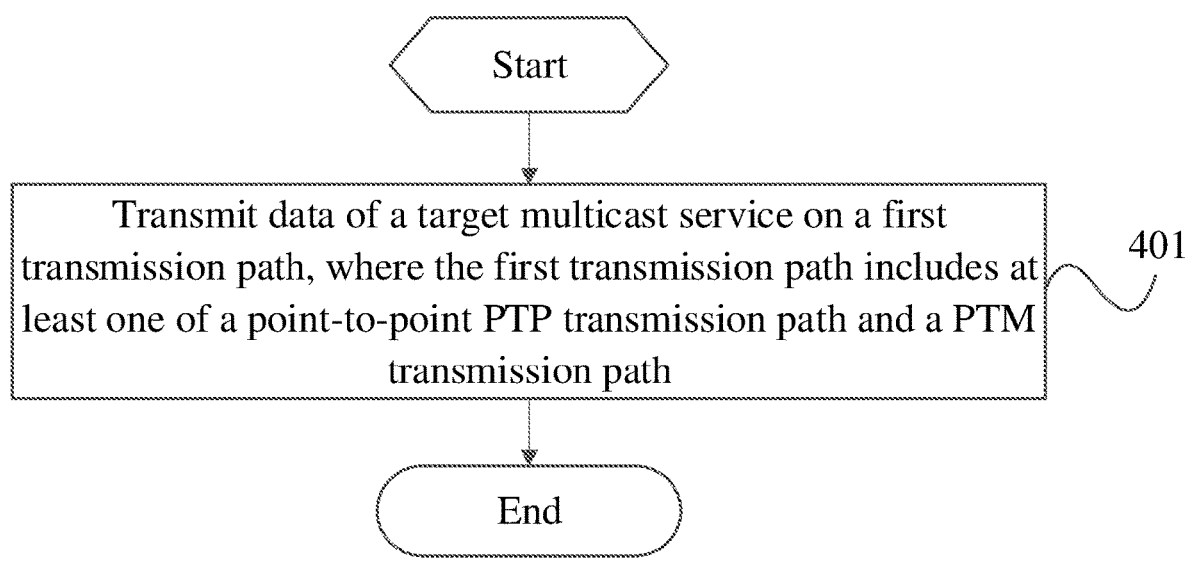
FIG. 4 is a second schematic flowchart of a multicast service transmission method according to an embodiment of this application.

As shown in FIG. 4, an embodiment of this application further provides a multicast service transmission method, applied to a network side device and including:

Step 401: Transmit data of a target multicast service on a first transmission path.

The first transmission path includes at least one of a PTP transmission path and a PTM transmission path.

In this embodiment of this application, a base station configures the PTP transmission path and the PTM transmission path for a terminal, and selects at least one transmission path from the PTM transmission path and the PTP transmission path to send the data of the target multicast service.

According to the multicast service transmission method in this embodiment of this application, at least one transmission path can be selected from a PTP transmission path and a PTM transmission path to send data of a target multicast service, that is, multicast service transmission can be flexibly performed by using the PTP transmission path and the PTM transmission path, thereby providing better QoS guarantee for services with relatively high service lossless and continuous requirements. Therefore, network resource efficiency is ensured, and an MB S service reception effect of a terminal is greatly improved on the basis of determining system efficiency.

In some implementations, the method in this embodiment of this application further includes:
sending transmission path configuration information, where
the transmission path configuration information is used to indicate configuration information of the PTM transmission path and the PTP transmission path.

In some implementations, the transmission path configuration information includes first configuration information and second configuration information;
the first configuration information is used to indicate configuration information of the PTM transmission path and configuration information of an MRB; and
the second configuration information is used to indicate configuration information and association information that are of the PTP transmission path, and the association information is used to indicate an MRB associated with the PTP transmission path, or is used to indicate a service identifier associated with the PTP transmission path.

In some implementations, the first configuration information is carried by using an SIB or broadcast signaling, and the second configuration information is carried by using RRC signaling; or
both the first configuration information and the second configuration information are carried by using RRC signaling.

In some implementations, the method in this embodiment of this application further includes:
configuring a target feedback location of a terminal, where the target feedback location is a location at which the terminal sends the first information; and
the target feedback location includes a dedicated feedback location for each terminal, or the target feedback location is a common feedback location.

It should be noted that a method for sending the transmission path configuration information and a method for configuring the target feedback location are described in detail in the foregoing method embodiment applied to the terminal side, and details are not described herein again.

In some implementations, the transmitting data of a target multicast service on a first transmission path includes:
transmitting first multicast service data on the PTM transmission path;
obtaining first information, where the first information is used to indicate a result of receiving the first multicast service data; and
sending second multicast service data on at least one of the PTP transmission path and the PTM transmission path according to the first information, where
the first multicast service data and the second multicast service data are data of the target multicast service.

In some implementations, the first multicast service data is initially transmitted data of the target multicast service, and the second multicast service data is retransmitted data of the first multicast service data.

In this embodiment of this application, retransmission and continuous transmission may be performed on another transmission path according to a transmission feedback on one transmission path (the PTP transmission path or the PTM transmission path), thereby ensuring QoS of receiving an MBS service by the terminal, and further improving system efficiency.

In some implementations, the data of the target multicast service includes third multicast service data and fourth multicast service data; and
the transmitting data of a target multicast service on a first transmission path includes:
replicating target data of the target multicast service to obtain third multicast service data and fourth multicast service data; and
transmitting the third multicast service data on the PTM transmission path, and transmitting the fourth multicast service data on the PTP transmission path.

In some implementations, the target data includes a PDCP PDU or a MAC PDU.

In some implementations, the method in this embodiment of this application further includes:
sending second information, where
the second information includes at least one of the following:
configuration information of duplication transmission; and
the second information is activation information of duplication transmission, where
the duplication transmission is transmitting the same multicast service data on the PTM transmission path and the PTP transmission path.

Herein, a solution for the duplication transmission is described in detail in the method embodiment on the terminal side, and details are not described herein again.

In some implementations, in the method in this embodiment of this application, after the obtaining first information, the method further includes:
selecting a transmission path from the PTM transmission path and the PTP transmission path according to at least one of a data type of the target multicast service, a quantity of terminals that receive the target multicast service, resource load, and the first information.

In some implementations, the method in this embodiment of this application further includes:
sending reconfiguration information, where the reconfiguration information is used to instruct a terminal to switch a transmission path of the multicast service data.

In some implementations, in a case that the reconfiguration information is used to instruct the terminal to switch the transmission path of the multicast service data from the PTM transmission path to the PTP transmission path,
after the sending reconfiguration information, the method further includes at least one of the following:
sending configuration information of the PTP transmission path;
maintaining a SN status corresponding to a PDCP layer before and after path switching;
transmitting, on the PTP transmission path, data that the terminal fails to receive on the PTM transmission path; and
obtaining a data reception status of the terminal on the PTM transmission path, and transmitting data on the PTP transmission path according to the data reception status of the terminal on the PTM transmission path.

In an embodiment of this application, if the network side determines to switch a transmission path of an MBS service from a PTM transmission path to a PTP transmission path, the PTP transmission path is configured for UE of interest (if the PTP transmission path is not previously established).

In an embodiment of this application, a security protection and/or header compression function may be enabled for a data packet for which switching to a PTP transmission path is performed, or both may not be disabled to maintain a PDCP layer function consistent with that in a PTM transmission manner.

In an embodiment of this application, when the PTM transmission path is used, if a HARQ feedback mechanism is enabled for the service, and UE in a connected state allocates a respective dedicated feedback location, the network side may know a reception status of each UE. Further, data that the terminal fails to receive on the PTM transmission path may be transmitted on the PTP transmission path according to the reception status. For example, PTM data packets whose PDCP SNs are 1 to 100 have been currently sent by the network side, and if a data packet of an SN 98 and preceding data packets are successfully received by UE 1 but the last two data packets fail to be received, a data packet of an SN 100 and all preceding data packets are successfully received by UE 2, and all data packets preceding SN 100 except a data packet of an SN 99 are successfully received by UE 3, the data packets of SNs 99 and 100 may be sent to the UE 1 and the data packet of the SN 99 may be sent to the UE 3 on the PTP transmission path.

In an embodiment of this application, the network side may configure all receiving UEs to report reception statuses of the receiving UEs on the PTM transmission path by using a PDCP status PDU, and the status PDU for reporting is sent to a common PDCP layer on the new PTP transmission path, to carry specific information about successful and unsuccessful reception. For example, the network side starts transmission on the new PTP transmission path for each UE according to a different reception status of each UE. For example, PTM data packets whose PDCP SNs are 1 to 100 have been currently sent by the network side, and if a data packet of an SN 98 and preceding data packets are successfully received by UE 1 but the last two data packets fail to be received, a data packet of an SN 100 and all preceding data packets are successfully received by UE 2, and all data packets preceding SN 100 except a data packet of an SN 99 are successfully received by UE 3, the network side sends data packets starting from the data packet of the SN 99 to the UE 1 in order, the network side sends data packets starting from a data packet of an SN 101 to the UE 2 in order, and the network side sends data packets starting from data packets of SNs 99, 101, and 102 to the UE 3 in order, or the network side directly sends data packets starting from the data packet of the SN 99 to each UE.

In some implementations, in a case that the reconfiguration information is used to instruct the terminal to switch the transmission path of the multicast service data from the PTP transmission path to the PTM transmission path, after the sending reconfiguration information, the method further includes at least one of the following:
sending configuration information of the PTM transmission path;
maintaining a SN status corresponding to a PDCP layer before and after path switching;
transmitting, on the PTM transmission path, data that the terminal fails to receive on the PTP transmission path; and
obtaining a data reception status of the terminal on the PTP transmission path, and transmitting data on the PTM transmission path according to the data reception status of the terminal on the PTP transmission path.

In an embodiment of this application, if the network side determines to switch a transmission path of an MBS service from the PTP transmission path to the PTM transmission path, the PTM transmission path is configured for the UE.

In an embodiment of this application, a HARQ feedback mechanism is generally enabled when the PTP transmission path is used. Therefore, the network side may clearly know a reception status of each UE. Therefore, data that the terminal fails to receive on the PTP transmission path may be transmitted on the PTM transmission path according to the reception status. For example, currently, on the network side, if a data packet of an SN 98 and preceding data packets are successfully received by UE 1 and a next data packet fails to be received, a data packet of an SN 102 and all preceding data packets are successfully received by UE 2, and all data packets preceding SN 103 except a data packet of an SN 99 are successfully received by UE 3, transmission may start from the data packet of the SN 99 on the PTM transmission path. In some implementations, the network side may first maintain the PTP transmission path for all receiving UEs, and configure UE to report a reception status by using a PDCP status PDU, and the status PDU for reporting is sent to the common PDCP layer on the PTP transmission path, to carry specific information about successful and unsuccessful reception. Therefore, the network side determines, according to a different reception status of each UE, to start to send which data packet on PTM, for example, starting from a data packet of an SN 104 because the fastest UE sends the data packet of the SN 104 or starting from a data packet of an SN 99 because this is an oldest unsuccessful data packet in all UEs. In some implementations, the network side directly starts to send a data packet of an SN 99 on PTM in a simpler manner. Some UEs receive duplicated packets, and duplication detection is performed for deletion.

In some implementations, because a reception status of each UE is different, the network side may reserve the PTP transmission path for each UE or some UE. It is assumed that sending of a data packet of an SN 104 starts on the PTM path. In this case, for UE 1, the network side sends these packets from SN 99 to SN 103 in order on the PTP transmission path, for UE 2, the network side sends a data packet of an SN 103 on the PTP transmission path, and for UE 3, the network side sends a data packet of an SN 99 packet on the PTP transmission path, so that the PTP path can be used to complete inconsistent sequence number gap data of all UE, thereby keeping data on the PTM path and the PTP path lossless.

In some implementations, the method in this embodiment of this application further includes:
sending a handover command, where
in a case that a transmission path on a target cell after a handover is the PTP transmission path, the handover command includes a reception status reporting indication, or in a case that a transmission path on the target cell after a handover is the PTM transmission path, the handover command includes at least one of configuration information of the PTP transmission path and a reception status reporting indication.

In some implementations, after the sending a handover command, the method further includes:

obtaining a PDCP control PDU report sent by a terminal; and sending target data according to the PDCP control PDU report, where the target data includes first data corresponding to a sequence number gap and data after the first data.

In an embodiment of this application, in different cells, L2 SNs of data packets of an MBS service may be synchronized between base stations or in a same base station, that is, for a same service data packet with same content, L2 SNs are equal, and the L2 SN may be a PDCP SN and/or an RLC SN. In the case of L2 SN synchronization, that is, reordering and duplication detection may be performed on received data of a PTP/PTM leg of the source cell and received data of a PTP/PTM leg of the target cell according to L2 SNs thereof to achieve continuity and lossless reception.

A signaling interaction process in a cell handover process is as follows:

a source cell sends a handover request to a target cell, where the handover request message carries information about MBS service;

the target cell sends a response message of the handover request to the source cell, where the response message includes a handover command instructing the source cell to send handover signaling to the terminal, and the response message carries at least one of configuration information, fourth information, and fifth information of the target multicast service, where the fourth information is used to indicate whether a reception status of the target multicast service needs to be fed back; and the fifth information is used to indicate whether to configure the PTP transmission path;

the terminal configures the corresponding MBS service according to the handover command, accesses the target cell, and initiates a PDCP status report according to the fourth information; and the target cell receives the PDCP status report and retransmits sequence number gap data on the PTP transmission path.

In some implementations, the method in this embodiment of this application further includes:

obtaining a handover request sent by the source cell, where the handover request carries SN status transfer information corresponding to a PDCP layer; and obtaining a reception situation or a sending situation that is of the target multicast service and that is sent by the source cell; and sending the data of the target multicast service on at least one of the PTP transmission path and the PTM transmission path according to the reception situation or the situation status of the target multicast service and the handover request.

In some implementations, the method in this embodiment of this application further includes:

obtaining a handover request sent by a source cell, where the handover request carries multicast service information; and sending a response message of the handover request, where the response message of the handover request includes at least one of configuration information, fourth information, and fifth information of the target multicast service, where the fourth information is used to indicate whether a reception status of the target multicast service needs to be fed back; and the fifth information is used to indicate whether to configure the PTP transmission path.

Further, in some implementations, the method in this embodiment of this application further includes:

obtaining a PDCP control PDU report sent by a terminal; and retransmitting sequence number gap data on the PTP transmission path according to the PDCP control PDU report.

In an embodiment of this application, when sending the handover request to the target cell, the source cell may carry an indication indicating whether an MBS service needs to be continuously received, for example, an indication indicating whether the SN status corresponding to the PDCP layer is to be transferred. According to this indication, if both parties agree to perform continuous reception, the source cell sends a reception situation or a sending situation of an MBS service of UE to the target cell, for example, which data is successfully received and which data fails to be received, and an SN of a next piece of new data. These acknowledgements of the source cell may be from HARQ feedback information. The target cell determines, according to the foregoing information, how to send the MBS service of the UE to ensure lossless transmission, for example, retransmit sequence number gap data by using the PTP transmission path.

According to the multicast service transmission method in this embodiment of this application, at least one transmission path can be selected from a PTP transmission path and a PTM transmission path to send data of a target multicast service, that is, multicast service transmission can be flexibly performed by using the PTP transmission path and the PTM transmission path, thereby providing better QoS guarantee for services with relatively high service lossless and continuous requirements. Therefore, network resource efficiency is ensured, and an MBS service reception effect of a terminal is greatly improved on the basis of determining system efficiency.

It should be noted that the multicast service transmission method provided in the embodiments of this application may be performed by a multicast service transmission apparatus, or a control module that is in the multicast service transmission apparatus and that is configured to perform multicast service transmission. In the embodiments of this application, that the multicast service transmission apparatus performs the multicast service transmission method is used as an example to describe the multicast service transmission apparatus provided in the embodiments of this application.

Figure 5:
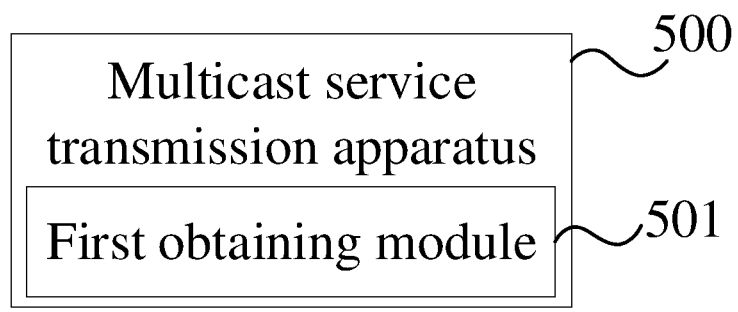
FIG. 5 is a first schematic module diagram of a multicast service transmission apparatus according to an embodiment of this application.

As shown in FIG. 5, an embodiment of this application provides a multicast service transmission apparatus 500, applied to a terminal and including:

a first obtaining module 501, configured to obtain data of a target multicast service on a first transmission path, where the first transmission path includes at least one of a point-to-point PTP transmission path and a PTM transmission path.

The multicast service transmission apparatus in this embodiment of this application further includes:

a second obtaining module, configured to obtain transmission path configuration information, where the transmission path configuration information is used to indicate configuration information of the PTM transmission path and the PTP transmission path.

According to the multicast service transmission apparatus in this embodiment of this application, the transmission path configuration information includes first configuration information and second configuration information;

the first configuration information is used to indicate configuration information of the PTM transmission path and configuration information of an MRB; and the second configuration information is used to indicate configuration information and association information that are of the PTP transmission path, and the association information is used to indicate an MRB associated with the PTP transmission path, or is used to indicate a service identifier associated with the PTP transmission path.

According to the multicast service transmission apparatus in this embodiment of this application, the first configuration information is carried by using a system information block SIB or broadcast signaling, and the second configuration information is carried by using RRC signaling; or both the first configuration information and the second configuration information are carried by using RRC signaling.

According to the multicast service transmission apparatus in this embodiment of this application, the first obtaining module includes:

a first receiving submodule, configured to receive first multicast service data on the PTM transmission path;

a first sending submodule, configured to send first information, where the first information is used to indicate a result of receiving the first multicast service data; and a first obtaining submodule, configured to obtain second multicast service data on at least one of the PTP transmission path and the PTM transmission path, where the first multicast service data and the second multicast service data are data of the target multicast service.

According to the multicast service transmission apparatus in this embodiment of this application, the first sending submodule is configured to send the first information at a target feedback location, where the first information includes an HARQ feedback, and the target feedback location includes a dedicated feedback location for each terminal, or the target feedback location is a common feedback location.

According to the multicast service transmission apparatus in this embodiment of this application, the first information includes at least one of a PDCP feedback and a protocol RLC feedback.

According to the multicast service transmission apparatus in this embodiment of this application, the first multicast service data is initially transmitted data of the target multicast service, and the second multicast service data is retransmitted data of the first multicast service data.

According to the multicast service transmission apparatus in this embodiment of this application, the data of the target multicast service includes third multicast service data and fourth multicast service data; and the first obtaining module is configured to: obtain the third multicast service data on the PTM transmission path, and obtain the fourth multicast service data on the PTP transmission path, where the third multicast service data and the fourth multicast service data are multicast service data obtained by replicating the same data in the target multicast service.

The multicast service transmission apparatus in this embodiment of this application further includes:

a first processing module, configured to perform first processing on the third multicast service data and the fourth multicast service data at a PDCP layer, a media access control MAC layer, or an RLC layer, where the first processing includes at least one of duplication detection, reordering, and HARQ combination.

The multicast service transmission apparatus in this embodiment of this application further includes:

a third obtaining module, configured to obtain second information, where the second information includes at least one of the following:

configuration information of duplication transmission; and activation information of duplication transmission, where the duplication transmission is transmitting the same multicast service data on the PTM transmission path and the PTP transmission path.

The multicast service transmission apparatus in this embodiment of this application further includes:

a fourth obtaining module, configured to obtain reconfiguration information, where the reconfiguration information is used to instruct the terminal to switch a transmission path of the multicast service data.

According to the multicast service transmission apparatus in this embodiment of this application, in a case that the reconfiguration information is used to instruct the terminal to switch the transmission path of the multicast service data from the PTM transmission path to the PTP transmission path, the apparatus further includes: a second processing module, configured to perform at least one of the following after the fourth obtaining module obtains the reconfiguration information:

if the terminal is in an idle state or an inactive state, entering, by the terminal, a connected state, requesting to configure the PTP transmission path, and maintaining a SN status of a PDCP layer corresponding to the PTM transmission path after obtaining configuration information of the PTP transmission path and establishing the PTP transmission path;

reporting a data reception status on the PTM transmission path; and performing data reception on the PTP transmission path, transmitting received data to the PDCP layer, and performing SN ordering on the transmitted data and original received data, and delivering the sorted data to an upper layer in order.

According to the multicast service transmission apparatus in this embodiment of this application, in a case that the reconfiguration information is used to instruct the terminal to switch the transmission path of the multicast service data from the PTP transmission path to the PTM transmission path, the apparatus further includes: a third processing module, configured to perform at least one of the following after the fourth obtaining module obtains the reconfiguration information:

if the terminal is in an idle state or an inactive state, obtaining configuration information of the PTM transmission path, and maintaining an SN status of a PDCP layer corresponding to the PTP transmission path after obtaining the configuration information of the PTM transmission path and establishing the PTM transmission path;

reserving the PTP transmission path and reporting a data reception status on the reserved PTP transmission path; and performing data reception on the PTM transmission path, transmitting received data to the PDCP layer, and performing SN ordering on the transmitted data and original received data, and delivering the sorted data to an upper layer in order.

The multicast service transmission apparatus in this embodiment of this application further includes:

a fourth processing module, configured to: in a case that a transmission path on a target cell after a handover is the PTP transmission path, after the terminal accesses the target cell, perform a PDCP control PDU report of the target multicast service according to a handover command; or in a case that a transmission path on a target cell after a handover is the PTM transmission path, after the terminal accesses the target cell, obtain configuration information of the PTP transmission path by using a handover command, establish the PTP transmission path according to the configuration information of the PTP transmission path, and perform a PDCP control PDU report and obtain target data according to the established PTP transmission path, where the target data includes first data corresponding to a sequence number gap and data after the first data.

According to the multicast service transmission apparatus in this embodiment of this application, at least one transmission path can be selected from a PTP transmission path and a PTM transmission path to obtain data of a target multicast service, that is, multicast service transmission can be flexibly performed by using the PTP transmission path and the PTM transmission path, thereby providing better QoS guarantee for services with relatively high service lossless and continuous requirements. Therefore, network resource efficiency is ensured, and an MB S service reception effect of a terminal is greatly improved on the basis of determining system efficiency.

The multicast service transmission apparatus in this embodiment of this application may be an apparatus, or may be a component, an integrated circuit, or a chip in a terminal. The apparatus may be a mobile terminal, or a non-mobile terminal. For example, the mobile device may include but is not limited to the types of the foregoing listed terminal 11, and the non-mobile terminal may be a server, a Network Attached Storage (NAS), a personal computer, a television, an automated teller machine, or a self-service machine. This is not specifically limited in the embodiments of this application.

The multicast service transmission apparatus in this embodiment of this application may be an apparatus with an operating system. The operating system may be an Android operating system, an iOS operating system, or another possible operating system. This is not specifically limited in the embodiments of this application.

The multicast service transmission apparatus provided in this embodiment of this application can implement the processes implemented in the method embodiments in FIG. 2 to FIG. 3. To avoid repetition, details are not described herein again.

Figure 6:
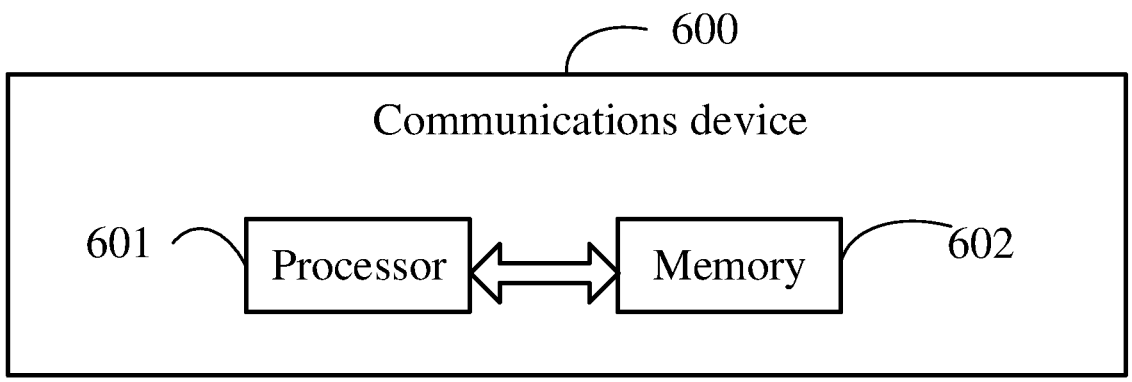
FIG. 6 is a structural block diagram of a communications device according to an embodiment of this application.

In some implementations, as shown in FIG. 6, an embodiment of this application further provides a communications device 600, including a processor 601, a memory 602, and a program or an instruction that is stored in the memory 602 and that can be run on the processor 601. For example, when the communications device 600 is a terminal, the program or the instruction is executed by the processor 601 to implement the processes of the foregoing multicast service transmission method embodiment applied to the terminal. When the communications device 600 is a network side device, the program or the instruction is executed by the processor 601 to implement the processes of the foregoing multicast service transmission method embodiment applied to the network side device. To avoid repetition, details are not described herein again.

Figure 7:
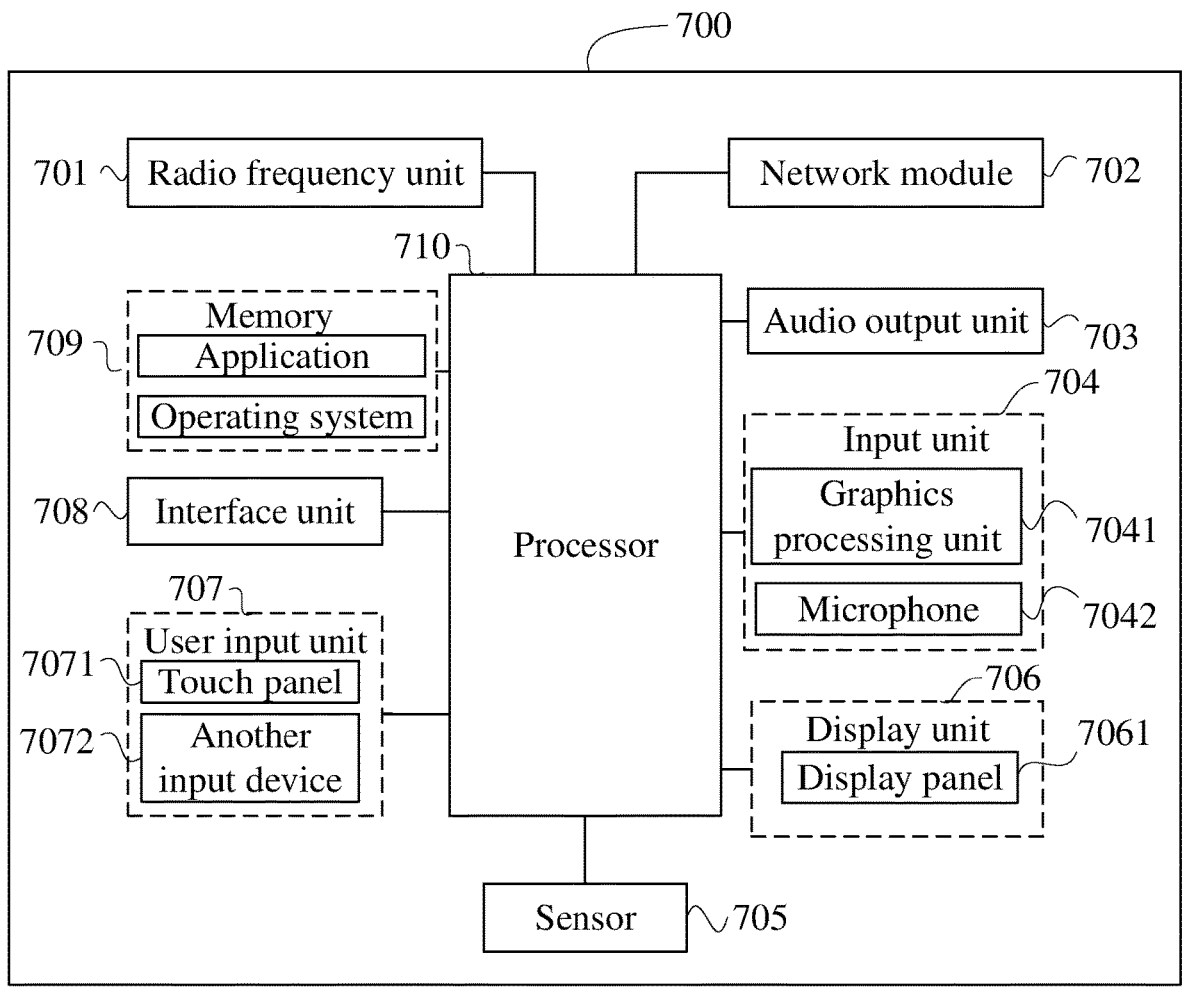
FIG. 7 is a structural block diagram of a terminal according to an embodiment of this application.

FIG. 7 is a schematic diagram of a hardware structure of a terminal according to an embodiment of this application. A terminal 700 includes but is not limited to components such as a radio frequency unit 701, a network module 702, an audio output unit 703, an input unit 704, a sensor 705, a display unit 706, a user input unit 707, an interface unit 708, a memory 709, and a processor 710.

A person skilled in the art can understand that the terminal 700 may further include a power supply (such as a battery) that supplies power to each component. The power supply may be logically connected to the processor 710 by using a power supply management system, to implement functions such as charging and discharging management, and power consumption management by using the power supply management system. The terminal structure shown in FIG. 7 constitutes no limitation on the terminal, and the terminal may include more or fewer components than those shown in the figure, or combine some components, or have different component arrangements. Details are not described herein.

It should be understood that, in this embodiment of this application, the input unit 704 may include a Graphics Processing Unit (GPU) 7041 and a microphone 7042, and the graphics processing unit 7041 processes image data of a still picture or a video obtained by an image capture apparatus (such as a camera) in a video capture mode or an image capture mode. The display unit 706 may include a display panel 7061. In some implementations, the display panel 7061 may be configured in a form such as a liquid crystal display or an organic light-emitting diode. The user input unit 707 includes a touch panel 7071 and another input device 7072. The touch panel 7071 is also referred to as a touchscreen. The touch panel 7071 may include two parts: a touch detection apparatus and a touch controller. The another input device 7072 may include but is not limited to a physical keyboard, a functional button (such as a volume control button or a power on/off button), a trackball, a mouse, and a joystick. Details are not described herein.

In this embodiment of this application, the radio frequency unit 701 receives downlink data from a network side device and then sends the downlink data to the processor 710 for processing; and sends uplink data to the network side device. Usually, the radio frequency unit 701 includes but is not limited to an antenna, at least one amplifier, a transceiver, a coupler, a low noise amplifier, a duplexer, and the like.

The memory 709 may be configured to store a software program or an instruction and various data. The memory 709 may mainly include a program or instruction storage area and a data storage area. The program or instruction storage area may store an operating system, and an application or an instruction required by at least one function (for example, a sound playing function or an image playing function). In addition, the memory 709 may include a high-speed random access memory, and may further include a non-volatile memory. The non-volatile memory may be a Read-Only Memory (ROM), a Programmable ROM (PROM), an Erasable PROM (EPROM), an Electrically EPROM (EEPROM), or a flash memory, for example, at least one disk storage component, a flash memory component, or another non-volatile solid-state storage component.

The processor 710 may include one or more processing units. In some implementations, an application processor and a modem processor may be integrated into the processor 710. The application processor mainly processes an operating system, a user interface, an application, an instruction, or the like. The modem processor mainly processes wireless communications, for example, a baseband processor. It can be understood that, in some implementations, the modem processor may not be integrated into the processor 710.

The radio frequency unit 701 is configured to obtain data of a target multicast service on a first transmission path, where the first transmission path includes at least one of a PTP transmission path and a PTM transmission path.

According to the terminal in this embodiment of this application, at least one transmission path can be selected from a PTP transmission path and a PTM transmission path to obtain data of a target multicast service, that is, multicast service transmission can be flexibly performed by using the PTP transmission path and the PTM transmission path, thereby providing better QoS guarantee for services with relatively high service lossless and continuous requirements. Therefore, network resource efficiency is ensured, and an MBS service reception effect of a terminal is greatly improved on the basis of determining system efficiency.

In some implementations, the radio frequency unit 701 is further configured to obtain transmission path configuration information, where the transmission path configuration information is used to indicate configuration information of the PTM transmission path and the PTP transmission path.

In some implementations, the transmission path configuration information includes first configuration information and second configuration information;

the first configuration information is used to indicate configuration information of the PTM transmission path and configuration information of a multicast radio bearer MRB; and the second configuration information is used to indicate configuration information and association information that are of the PTP transmission path, and the association information is used to indicate an MRB associated with the PTP transmission path, or is used to indicate a service identifier associated with the PTP transmission path.

In some implementations, the first configuration information is carried by using an SIB or broadcast signaling, and the second configuration information is carried by using RRC signaling; or both the first configuration information and the second configuration information are carried by using RRC signaling.

In some implementations, the radio frequency unit 701 is configured to: receive first multicast service data on the PTM transmission path; send first information, where the first information is used to indicate a result of receiving the first multicast service data; and obtain second multicast service data on at least one of the PTP transmission path and the PTM transmission path, where the first multicast service data and the second multicast service data are data of the target multicast service.

In some implementations, the radio frequency unit 701 is configured to send the first information at a target feedback location, where the first information includes an HARQ feedback, and the target feedback location includes a dedicated feedback location for each terminal, or the target feedback location is a common feedback location.

In some implementations, the first information includes at least one of a PDCP feedback and a protocol RLC feedback.

In some implementations, the first multicast service data is initially transmitted data of the target multicast service, and the second multicast service data is retransmitted data of the first multicast service data.

In some implementations, the data of the target multicast service includes third multicast service data and fourth multicast service data; and the radio frequency unit 701 is configured to: obtain the third multicast service data on the PTM transmission path, and obtain the fourth multicast service data on the PTP transmission path, where the third multicast service data and the fourth multicast service data are multicast service data obtained by replicating the same data in the target multicast service.

In some implementations, the processor 710 is configured to perform first processing on the third multicast service data and the fourth multicast service data at a PDCP layer, a MAC layer, or an RLC layer, where the first processing includes at least one of duplication detection, reordering, and HARQ combination.

In some implementations, the radio frequency unit 701 is configured to obtain second information, where the second information includes at least one of the following:

configuration information of duplication transmission; and activation information of duplication transmission, where the duplication transmission is transmitting the same multicast service data on the PTM transmission path and the PTP transmission path.

In some implementations, the radio frequency unit 701 is configured to obtain reconfiguration information, where the reconfiguration information is used to instruct the terminal to switch a transmission path of the multicast service data.

In some implementations, in a case that the reconfiguration information is used to instruct the terminal to switch the transmission path of the multicast service data from the PTM transmission path to the PTP transmission path, the processor 710 is further configured to perform at least one of the following:

if the terminal is in an idle state or an inactive state, entering, by the terminal, a connected state, requesting to configure the PTP transmission path, and maintaining a sequence number SN status of a PDCP layer corresponding to the PTM transmission path after obtaining configuration information of the PTP transmission path and establishing the PTP transmission path;

reporting a data reception status on the PTM transmission path; and performing data reception on the PTP transmission path, transmitting received data to the PDCP layer, and performing SN ordering on the transmitted data and original received data, and delivering the sorted data to an upper layer in order.

In some implementations, in a case that the reconfiguration information is used to instruct the terminal to switch the transmission path of the multicast service data from the PTP transmission path to the PTM transmission path, the processor 710 is further configured to perform at least one of the following:

if the terminal is in an idle state or an inactive state, obtaining configuration information of the PTM transmission path, and maintaining an SN status of a PDCP layer corresponding to the PTP transmission path after obtaining the configuration information of the PTM transmission path and establishing the PTM transmission path;

reserving the PTP transmission path and reporting a data reception status on the reserved PTP transmission path; and performing data reception on the PTM transmission path, transmitting received data to the PDCP layer, and performing SN ordering on the transmitted data and original received data, and delivering the sorted data to an upper layer in order.

In some implementations, the processor 710 is configured to: in a case that a transmission path on a target cell after a handover is the PTP transmission path, after the terminal accesses the target cell, perform a PDCP control PDU report of the target multicast service according to a handover command; or in a case that a transmission path on a target cell after a handover is the PTM transmission path, after the terminal accesses the target cell, obtain configuration information of the PTP transmission path by using a handover command, establish the PTP transmission path according to the configuration information of the PTP transmission path, and perform a PDCP control PDU report and obtain target data according to the established PTP transmission path, where the target data includes first data corresponding to a sequence number gap and data after the first data.

According to the terminal in this embodiment of this application, at least one transmission path can be selected from a PTP transmission path and a PTM transmission path to obtain data of a target multicast service, that is, multicast service transmission can be flexibly performed by using the PTP transmission path and the PTM transmission path, thereby providing better QoS guarantee for services with relatively high service lossless and continuous requirements. Therefore, network resource efficiency is ensured, and an MBS service reception effect of a terminal is greatly improved on the basis of determining system efficiency.

Figure 8:
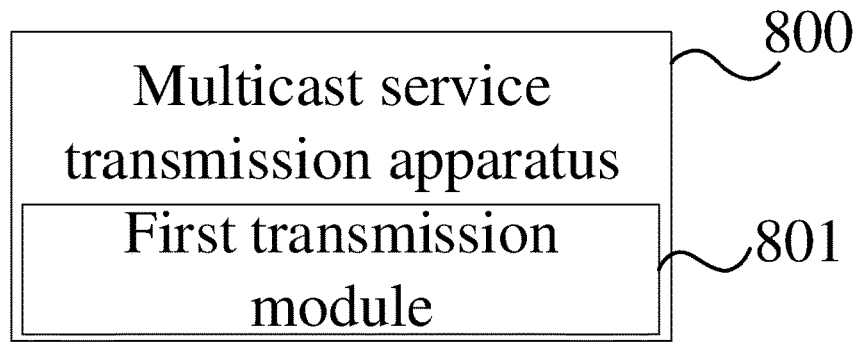
FIG. 8 is a second schematic module diagram of a multicast service transmission apparatus according to an embodiment of this application.

As shown in FIG. 8, an embodiment of this application further provides a multicast service transmission apparatus 800, applied to a network side device and including:

a first transmission module 801, configured to transmit data of a target multicast service on a first transmission path, where the first transmission path includes at least one of a PTP transmission path and a PTM transmission path.

The multicast service transmission apparatus in this embodiment of this application further includes:

a first sending module, configured to send transmission path configuration information, where the transmission path configuration information is used to indicate configuration information of the PTM transmission path and the PTP transmission path.

According to the multicast service transmission apparatus in this embodiment of this application, the transmission path configuration information includes first configuration information and second configuration information;

the first configuration information is used to indicate configuration information of the PTM transmission path and configuration information of an MRB; and the second configuration information is used to indicate configuration information and association information that are of the PTP transmission path, and the association information is used to indicate an MRB associated with the PTP transmission path, or is used to indicate a service identifier associated with the PTP transmission path.

According to the multicast service transmission apparatus in this embodiment of this application, the first configuration information is carried by using an SIB or broadcast signaling, and the second configuration information is carried by using RRC signaling; or both the first configuration information and the second configuration information are carried by using RRC signaling.

The multicast service transmission apparatus in this embodiment of this application further includes:

a configuration module, configured to configure a target feedback location of a terminal, where the target feedback location is a location at which the terminal sends the first information; and the target feedback location includes a dedicated feedback location for each terminal, or the target feedback location is a common feedback location.

According to the multicast service transmission apparatus in this embodiment of this application, the first transmission module includes:

a first transmission submodule, configured to transmit first multicast service data on the PTM transmission path;

a second obtaining submodule, configured to obtain first information, where the first information is used to indicate a result of receiving the first multicast service data; and a second sending submodule, configured to send second multicast service data on at least one of the PTP transmission path and the PTM transmission path according to the first information, where the first multicast service data and the second multicast service data are data of the target multicast service.

According to the multicast service transmission apparatus in this embodiment of this application, the first multicast service data is initially transmitted data of the target multicast service, and the second multicast service data is retransmitted data of the first multicast service data.

According to the multicast service transmission apparatus in this embodiment of this application, the data of the target multicast service includes third multicast service data and fourth multicast service data; and the first transmission module includes:

a replication submodule, configured to replicate target data of the target multicast service to obtain third multicast service data and fourth multicast service data; and a second transmission submodule, configured to: transmit the third multicast service data on the PTM transmission path, and transmit the fourth multicast service data on the PTP transmission path.

According to the multicast service transmission apparatus in this embodiment of this application, the target data includes a PDCP PDU or a MAC PDU.

The multicast service transmission apparatus in this embodiment of this application further includes:

a second sending module, configured to send second information, where the second information includes at least one of the following:

configuration information of duplication transmission; and the second information is activation information of duplication transmission, where the duplication transmission is transmitting the same multicast service data on the PTM transmission path and the PTP transmission path.

The multicast service transmission apparatus in this embodiment of this application further includes:

a selection module, configured to: after the second obtaining submodule obtains the first information, select a transmission path from the PTM transmission path and the PTP transmission path according to at least one of a data type of the target multicast service, a quantity of terminals that receive the target multicast service, resource load, and the first information.

The multicast service transmission apparatus in this embodiment of this application further includes:

a third sending module, configured to send reconfiguration information, where the reconfiguration information is used to instruct the terminal to switch a transmission path of the multicast service data.

According to the multicast service transmission apparatus in this embodiment of this application, in a case that the reconfiguration information is used to instruct the terminal to switch the transmission path of the multicast service data from the PTM transmission path to the PTP transmission path, the apparatus further includes: a fifth processing module, configured to perform at least one of the following after the third sending module sends the reconfiguration information:

sending configuration information of the PTP transmission path;

maintaining a SN status corresponding to a PDCP layer before and after path switching;

transmitting, on the PTP transmission path, data that the terminal fails to receive on the PTM transmission path; and obtaining a data reception status of the terminal on the PTM transmission path, and transmitting data on the PTP transmission path according to the data reception status of the terminal on the PTM transmission path.

According to the multicast service transmission apparatus in this embodiment of this application, in a case that the reconfiguration information is used to instruct the terminal to switch the transmission path of the multicast service data from the PTP transmission path to the PTM transmission path, the apparatus further includes: a sixth processing module, configured to perform at least one of the following after the third sending module sends the reconfiguration information:

sending configuration information of the PTM transmission path;

maintaining a SN status corresponding to a PDCP layer before and after path switching;

transmitting, on the PTM transmission path, data that the terminal fails to receive on the PTP transmission path; and obtaining a data reception status of the terminal on the PTP transmission path, and transmitting data on the PTM transmission path according to the data reception status of the terminal on the PTP transmission path.

The multicast service transmission apparatus in this embodiment of this application further includes:

a fourth sending module, configured to send a handover command, where in a case that a transmission path on a target cell after a handover is the PTP transmission path, the handover command includes a reception status reporting indication, or in a case that a transmission path on a target cell after a handover is the PTM transmission path, the handover command includes at least one of configuration information of the PTP transmission path and a reception status reporting indication.

The multicast service transmission apparatus in this embodiment of this application further includes:

a fifth obtaining module, configured to: after the fourth sending module sends the handover command, obtain a PDCP control PDU report sent by a terminal; and a fifth sending module, configured to send target data according to the PDCP control PDU report, where the target data includes first data corresponding to a sequence number gap and data after the first data.

The multicast service transmission apparatus in this embodiment of this application further includes:

a sixth obtaining module, configured to obtain a handover request sent by a source cell, where the handover request carries third information, and the third information is used to indicate whether to transfer an SN status corresponding to a PDCP layer;

a seventh obtaining module, configured to: in a case that it is determined that the SN status corresponding to the PDCP layer needs to be transferred, obtain a receiving situation or a sending situation that is of the target multicast service and that is sent by the source cell; and a sixth sending module, configured to send the data of the target multicast service on at least one of the PTP transmission path and the PTM transmission path according to the receiving situation or the sending situation of the target multicast service.

The multicast service transmission apparatus in this embodiment of this application further includes:

an eighth obtaining module, configured to obtain a handover request sent by a source cell, where the handover request carries multicast service information; and a seventh sending module, configured to send a response message of the handover request, where the response message of the handover request includes at least one of configuration information, fourth information, and fifth information of the target multicast service, where the fourth information is used to indicate whether a reception status of the target multicast service needs to be fed back; and the fifth information is used to indicate whether to configure the PTP transmission path.

The multicast service transmission apparatus in this embodiment of this application further includes:

a ninth obtaining module, configured to obtain a PDCP control PDU report sent by a terminal; and a retransmission module, configured to retransmit sequence number gap data on the PTP transmission path according to the PDCP control PDU report.

According to the multicast service transmission apparatus in this embodiment of this application, at least one transmission path can be selected from a PTP transmission path and a PTM transmission path to send data of a target multicast service, that is, multicast service transmission can be flexibly performed by using the PTP transmission path and the PTM transmission path, thereby providing better QoS guarantee for services with relatively high service lossless and continuous requirements. Therefore, network resource efficiency is ensured, and an MBS service reception effect of a terminal is greatly improved on the basis of determining system efficiency.

Figure 9:
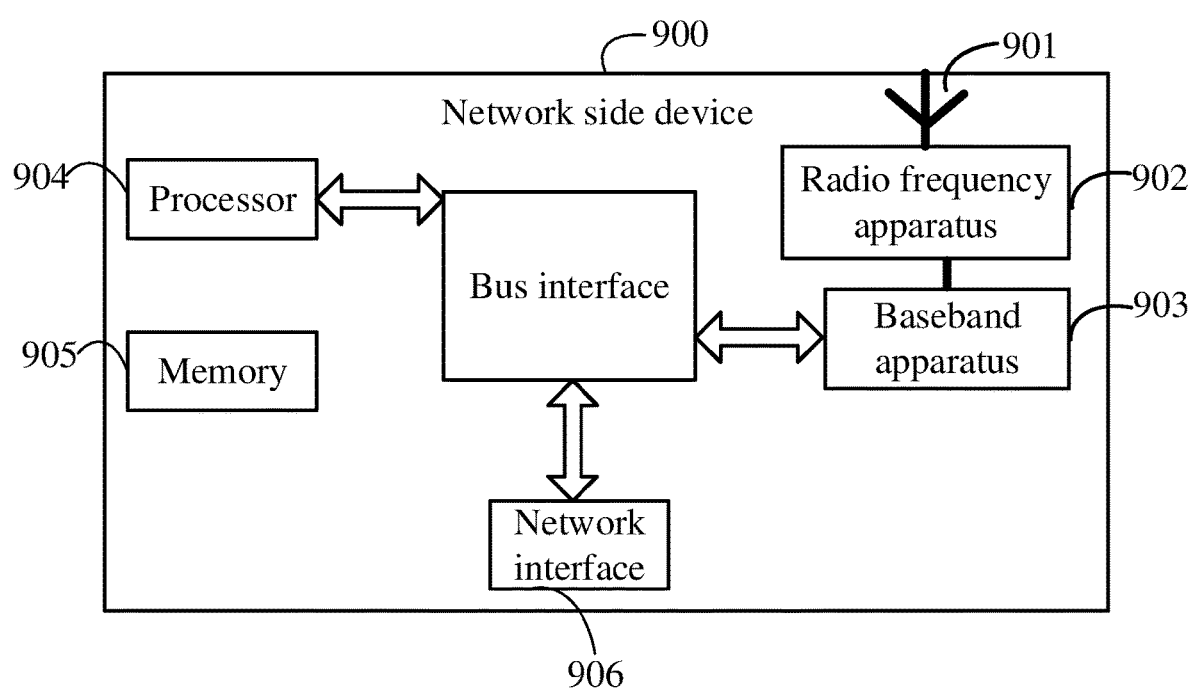
FIG. 9 is a structural block diagram of a network side device according to an embodiment of this application.

In some implementations, an embodiment of this application further provides a network side device. As shown in FIG. 9, a network device 9200 includes an antenna 901, a radio frequency apparatus 902, and a baseband apparatus 903. The antenna 901 is connected to the radio frequency apparatus 902. In an uplink direction, the radio frequency apparatus 902 receives information by using the antenna 901, and sends the received information to the baseband apparatus 903 for processing. In a downlink direction, the baseband apparatus 903 processes information that needs to be sent, and sends processed information to the radio frequency apparatus 902. The radio frequency apparatus 902 processes the received information, and sends processed information by using the antenna 901.

The frequency band processing apparatus may be located in the baseband apparatus 903. The method performed by the network side device in the foregoing embodiment may be implemented in the baseband apparatus 903. The baseband apparatus 903 includes a processor 904 and a memory 905.

The baseband apparatus 903 may include, for example, at least one baseband board, where a plurality of chips are disposed on the baseband board. As shown in FIG. 9, one chip is, for example, the processor 904, which is connected to the memory 905, so as to invoke a program in the memory 905 to perform operations of the network device shown in the foregoing method embodiment.

The baseband apparatus 903 may further include a network interface 906, configured to exchange information with the radio frequency apparatus 902. For example, the interface is a Common Public Radio Interface (CPRI).

In some implementations, the network side device in this embodiment of the present disclosure further includes an instruction or a program that is stored in the memory 905 and that can be run on the processor 904. The processor 904 invokes the instruction or the program in the memory 905 to perform the method performed by the modules shown in FIG. 8, and a same technical effect is achieved. To avoid repetition, details are not described herein again.

An embodiment of this application further provides a readable storage medium. The readable storage medium may be non-transient, and the readable storage medium stores a program or an instruction, where the program or the instruction is executed by a processor to implement the processes of the foregoing multicast service transmission method embodiment and a same technical effect can be achieved. To avoid repetition, details are not described herein again.

The processor is a processor in the terminal in the foregoing embodiment. The readable storage medium includes a computer-readable storage medium, such as a computer Read-Only Memory (ROM), a Random Access Memory (RAM), a magnetic disk, or an optical disc.

An embodiment of this application further provides a chip. The chip includes a processor and a communications interface, the communications interface is coupled to the processor, and the processor is configured to run a program or an instruction to implement the processes of the foregoing multicast service transmission method embodiment. To avoid repetition, details are not described herein again.

An embodiment of this application further provides a computer program product. The computer program product is stored in a non-volatile storage medium, and the computer program product is executed by at least one processor to implement the processes of the foregoing multicast service transmission method embodiment. To avoid repetition, details are not described herein again.

It should be understood that the chip mentioned in this embodiment of this application may also be referred to as a system-level chip, a system chip, a chip system, or an on-chip system chip.

It should be noted that, in this specification, the terms "include," "comprise," or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "including a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may understand that the method in the foregoing embodiment may be implemented by software in addition to a necessary universal hardware platform or by hardware only. Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, a network device, or the like) to perform the methods described in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A multicast service transmission method, performed by a terminal, wherein the method comprises:
    obtaining data of a target multicast service on a first transmission path, wherein the first transmission path comprises at least one of a Point-To-Point (PTP) transmission path or a Point-To-Multipoint (PTM) transmission path;
    when a transmission path on a target cell after a handover is the PTP transmission path, after the terminal accesses the target cell, performing a Packet Data Convergence Protocol (PDCP) control Protocol Data Unit (PDU) report of the target multicast service according to a handover command; or
    when a transmission path on a target cell after a handover is the PTM transmission path, after the terminal accesses the target cell, obtaining configuration information of the PTP transmission path by using a handover command, establishing the PTP transmission path according to the configuration information of the PTP transmission path, and performing a PDCP control PDU report.

2. The method according to claim 1, further comprising:
    obtaining transmission path configuration information,
    wherein the transmission path configuration information is used to indicate configuration information of the PTM transmission path and the configuration information of the PTP transmission path.

3. The method according to claim 2, wherein the transmission path configuration information comprises first configuration information and second configuration information;
    the first configuration information is used to indicate the configuration information of the PTM transmission path and configuration information of a Multicast Radio Bearer (MRB); and the second configuration information is used to indicate the configuration information of the PTP transmission path and association information of the PTP transmission path, and the association information is used to indicate an MRB associated with the PTP transmission path, or is used to indicate a service identifier associated with the PTP transmission path.

4. The method according to claim 3, wherein the first configuration information is carried by using a System Information Block (SIB) or broadcast signaling, and the second configuration information is carried by using Radio Resource Control (RRC) signaling; or
both the first configuration information and the second configuration information are carried by using RRC signaling.

5. The method according to claim 1, wherein the obtaining data of a target multicast service on a first transmission path comprises:
receiving first multicast service data on the PTM transmission path;
sending first information, wherein the first information is used to indicate a result of receiving the first multicast service data; and
obtaining second multicast service data on at least one of the PTP transmission path or the PTM transmission path, wherein the first multicast service data and the second multicast service data are data of the target multicast service.

6. The method according to claim 5, wherein the sending first information comprises:
sending the first information at a target feedback location, wherein the first information comprises a Hybrid Automatic Repeat reQuest (HARQ) feedback, and the target feedback location comprises a dedicated feedback location for each terminal, or the target feedback location is a common feedback location.

7. The method according to claim 5, wherein the first information comprises at least one of a Packet Data Convergence Protocol (PDCP) feedback or a Radio Link Control (RLC) feedback.

8. The method according to claim 5, wherein the first multicast service data is initially transmitted data of the target multicast service, and the second multicast service data is retransmitted data of the first multicast service data.

9. The method according to claim 1, wherein the data of the target multicast service comprises third multicast service data and fourth multicast service data; and
the obtaining data of a target multicast service on a first transmission path comprises:
obtaining the third multicast service data on the PTM transmission path, and obtaining the fourth multicast service data on the PTP transmission path,
wherein the third multicast service data and the fourth multicast service data are multicast service data obtained by replicating the same data in the target multicast service.

10. The method according to claim 9, further comprising:
performing first processing on the third multicast service data and the fourth multicast service data at a Packet Data Convergence Protocol (PDCP) layer, a Media Access Control (MAC) layer, or a Radio Link Control (RLC) layer, wherein
the first processing comprises at least one of duplication detection, reordering, or a Hybrid Automatic Repeat reQuest (HARQ) combination.

11. The method according to claim 9, further comprising:
obtaining second information, wherein the second information comprises at least one of the following:
configuration information of duplication transmission; or
activation information of duplication transmission, wherein the duplication transmission is transmitting the same multicast service data on the PTM transmission path and the PTP transmission path.

12. The method according to claim 1, further comprising:
obtaining reconfiguration information, wherein the reconfiguration information is used to instruct the terminal to switch a transmission path of the multicast service data.

13. The method according to claim 12, wherein when the reconfiguration information is used to instruct the terminal to switch the transmission path of the multicast service data from the PTM transmission path to the PTP transmission path,
after the obtaining reconfiguration information, the method further comprises at least one of the following:
when the terminal is in an idle state or an inactive state, entering, by the terminal, a connected state, requesting to configure the PTP transmission path, and maintaining a Sequence Number (SN) status of a Packet Data Convergence Protocol (PDCP) layer corresponding to the PTM transmission path after obtaining the configuration information of the PTP transmission path and establishing the PTP transmission path;
reporting a data reception status on the PTM transmission path; or
performing data reception on the PTP transmission path to obtain received data transmitting the received data to the PDCP layer, and performing SN ordering on the received data and original received data to obtain sorted data, and delivering the sorted data to an upper layer in order.

14. The method according to claim 12, wherein when the reconfiguration information is used to instruct the terminal to switch the transmission path of the multicast service data from the PTP transmission path to the PTM transmission path,
after the obtaining reconfiguration information, the method further comprises at least one of the following:
when the terminal is in an idle state or an inactive state, obtaining configuration information of the PTM transmission path, and maintaining a Sequence Number (SN) status of a Packet Data Convergence Protocol (PDCP) layer corresponding to the PTP transmission path after obtaining the configuration information of the PTM transmission path and establishing the PTM transmission path;
reserving the PTP transmission path and reporting a data reception status on the reserved PTP transmission path; or
performing data reception on the PTM transmission path to obtain received data, transmitting the received data to the PDCP layer, and performing SN ordering on the received data and original received data to obtain sorted data, and delivering the sorted data to an upper layer in order.

15. The method according to claim 1,
wherein when the transmission path on the target cell after the handover is the PTM transmission path, the method further comprises: obtaining target data according to the established PTM transmission path, wherein the target data comprises first data corresponding to a sequence number gap and data after the first data.

16. A multicast service transmission method, performed by a network side device, wherein the method comprises:

transmitting data of a target multicast service on a first transmission path, wherein the first transmission path comprises at least one of a Point-To-Point (PTP) transmission path or a Point-To-Multipoint (PTM) transmission path, wherein when a transmission path on a target cell after a handover is the PTP transmission path, after a terminal accesses the target cell, a Packet Data Convergence Protocol (PDCP) control Protocol Data Unit (PDU) report of the target multicast service is performed according to a bandover command, or wherein when a transmission path on a target cell after a handover is the PTM transmission path, after a terminal accesses the target cell, configuration information of the PTP transmission path is obtained by using a handover command, the PTP transmission path is established according to the configuration information of the PTP transmission path, and a PDCP control PDU report is performed.

17. The method according to claim 16, further comprising:

sending transmission path configuration information, wherein the transmission path configuration information is used to indicate configuration information of the PTM transmission path and the configuration information of the PTP transmission path.

18. The method according to claim 17, wherein the transmission path configuration information comprises first configuration information and second configuration information;

the first configuration information is used to indicate the configuration information of the PTM transmission path and configuration information of a Multicast Radio Bearer (MRB); and the second configuration information is used to indicate the configuration information of the PTP transmission path and association information of the PTP transmission path, and the association information is used to indicate an MRB associated with the PTP transmission path, or is used to indicate a service identifier associated with the PTP transmission path.

19. A terminal, comprising:

a memory storing computer-readable instructions; and a processor coupled to the memory and configured to store the computer-readable instructions, wherein the computer-readable instructions, when executed by the processor, cause the processor to perform operations comprising:

obtaining data of a target multicast service on a first transmission path, wherein the first transmission path comprises at least one of a Point-To-Point (PTP) transmission path or a Point-To-Multipoint (PTM) transmission path;

when a transmission path on a target cell after a handover is the PTP transmission path, after the terminal accesses the target cell, performing a Packet Data Convergence Protocol (PDCP) control Protocol Data Unit (PDU) report of the target multicast service according to a handover command; or when a transmission path on a target cell after a handover is the PTM transmission path, after the terminal accesses the target cell, obtaining configuration information of the PTP transmission path by using a handover command, establishing the PTP transmission path according to the configuration information of the PTP transmission path, and performing a PDCP control PDU report.

20. A network side device, comprising a processor, a memory, and a program or an instruction that is stored in the memory and that is configured to be run on the processor, wherein the program or the instruction is executed by the processor to implement the multicast service transmission method according to claim 16.

* * * * *